United States Patent [19]

De Zen

[11] 4,401,424
[45] Aug. 30, 1983

[54] VACUUM SIZING DEVICE

[76] Inventor: Vittorio De Zen, 5 Riverview, Woodbridge, Ontario, Canada

[21] Appl. No.: 348,467

[22] Filed: Feb. 12, 1982

[51] Int. Cl.³ .............................................. B29C 17/04
[52] U.S. Cl. ................................ 425/388; 425/326.1; 249/134
[58] Field of Search ...................... 425/225, 226.1, 388, 425/405 R, 380

[56] References Cited

U.S. PATENT DOCUMENTS

| | | | |
|---|---|---|---|
| 2,519,375 | 8/1950 | Jargstorff et al. | 425/326.1 X |
| 3,008,186 | 11/1961 | Voigt | 425/326.1 |
| 3,239,881 | 3/1966 | Larsen | 425/326.1 |
| 3,248,463 | 4/1966 | Wiley et al. | 425/326.1 X |
| 3,538,210 | 11/1970 | Gatto | 425/326.1 X |
| 3,792,951 | 2/1974 | Meyers | 425/326 |
| 3,932,080 | 1/1976 | Uemura et al. | 425/388 X |
| 4,088,724 | 5/1978 | Kihnert | 425/326.1 X |
| 4,113,411 | 9/1978 | Terragni | 425/325 |
| 4,120,926 | 10/1978 | Titz | 264/176 R |
| 4,181,487 | 1/1980 | Kessler | 425/326.1 |
| 4,329,314 | 5/1982 | Jackson et al. | 425/388 X |

FOREIGN PATENT DOCUMENTS

| | | |
|---|---|---|
| 1184941 | 1/1965 | Fed. Rep. of Germany . |
| 2152060 | 4/1972 | Fed. Rep. of Germany ...... 425/388 |
| 1316597 | 5/1963 | France . |
| 2086713 | 12/1971 | France . |
| 2209662 | 7/1974 | France . |
| 4536020 | 11/1970 | Japan ................................ 425/326.1 |
| 1282908 | 7/1972 | United Kingdom . |
| 1516598 | 7/1978 | United Kingdom . |
| 2015418 | 9/1979 | United Kingdom . |

Primary Examiner—J. Howard Flint, Jr.
Attorney, Agent, or Firm—Rogers, Bereskin & Parr

[57] ABSTRACT

The disclosure relates to a vacuum sizing device for cooling and sizing plastic extrusions immediately downstream of the extrusion die. The device includes a plurality of pairs of upper and lower sizing elements which are clamped between upper and lower backing members. The elements are shaped to define a passageway through the sizing device having a cross-sectional shape and size corresponding to the required profile shape and size of the extrusion. Vacuum chambers and cooling chambers are provided in the sizing elements.

10 Claims, 4 Drawing Figures

VACUUM SIZING DEVICE

This invention relates to vacuum sizing devices used in the manufacture of plastic extrusions to cool and size an extrusion immediately downstream of the extrusion die. Vacuum sizing devices are sometimes also known as "calibrators", but for convenience of description, the former term will be used.

A plastic extrusion leaving an extrusion die is normally in a relatively hot and mouldable form and, as a result, will not normally maintain the shape set by the extrusion die unless special precautions are taken to hold the extrusion in that shape. In some cases, changes in shape are not important (e.g. where the extrusion is to be subsequently blow-moulded), but in many cases precise control over the profile shape and size of the extrusion is required. Elaborate jigs having "fingers" which engage and hold the extrusion while it cools in the air are often used. However, these devices require skilled personnel to accurately set up the fingers and to continuously monitor the dimensions of the extrusion downstream of the jig to ensure that proper control is being maintained. Also, the jig must hold the extrusion over a relatively long distance to ensure that control is maintained until the extrusion has fully cooled.

Vacuum sizing devices were therefore developed for extrusions which are required to meet precise profile size and shape tolerances. An example of a situation in which such precise control is required is in the manufacture of plastic extrusions for use as parts of plastic window frames. The September, 1981 edition of the publication "Modern Plastics" discloses at page 14 an example of a conventional vacuum sizing device (there called a "calibrator") in use in the manufacture of pvc window frames.

A conventional vacuum sizing device is a relatively massive and cumbersome structure, typically three or four feet in length and weighs several hundred pounds. Extending through the structure is a passageway through which the extrusion travels, and the cross-sectional shape of which is accurately dimensioned to the required final external dimensions of the extrusion. The structure is made as an upper part and a lower part which meet at a joint line containing the passageway so that one longitudinal part of the passageway is formed in the lower part of the structure while the upper part defines the other longitudinal part of the passageway. The two parts are bolted together when the device is in use so that the parts co-operate to accurately define the passageway.

It will be appreciated that the surfaces which define the walls of the passageway must be accurately machined and provided with suitable surface finishes because any defect in the surface of a wall of the passageway will be transferred to the extrusion. Vacuum ports are normally also provided in the walls of the passageway for connection to an external source of vacuum so that an extrusion travelling through the passageway will be positively held by the vacuum against the wall surfaces. Again, these ports must be carefully machined so as to avoid or at least minimize the possibility of marking the extrusion.

Cooling water passageways are normally also provided in either or both of the upper and lower parts of the sizing device so that cooling water can be circulated through the device for assisting rapid setting of the plastic material.

Conventionally, the upper and lower parts of a vacuum sizing device are unitary structures machined in one piece. It will be appreciated that the machining time and skill required to manufacture these parts is substantial. Typically, several longitudinal passageways have to be drilled through the entire length of at least one of the parts (a distance of three or four feet or more). Transverse passageways meeting with these longitudinal passageways must often be drilled laterally through the parts and the respective passageways plugged at their ends as appropriate to the required route for cooling water or vacuum as the case may be. It will, of course, be appreciated that not all vacuum sizing devices will be similar. In most cases, the cooling passageways and vacuum passageways will have to be specially positioned according to the profile of the particular extrusion being manufactured. Generally, larger parts of a profile will require more cooling and more vacuum than larger (thinner) parts.

It will be appreciated from the foregoing that such conventional vacuum sizing devices are technically very difficult to manufacture and are therefore extremely costly. At the same time, they are large and bulky and can only be moved by several people, or with the aid of lifting equipment. Not only does this make handling and set-up of the devices inconvenient but, it can cause extreme difficulties in abnormal situations, for example, in the case of a power failure when an extrusion may solidify in the passageway in the vacuum sizing device. At such times, it is extremely difficult to separate the two parts of the device and remove the extrusion; in fact, it may be impossible to separate the parts of the device where the extrusion has a re-entrant profile.

An object of the present invention is to provide an improved vacuum sizing device.

According to the invention, the device has a passageway which extends longitudinally therethrough and which has a cross-sectional size and shape corresponding to the required profile, size and shape of a plastic extrusion to be sized in the device. The device includes a plurality of pairs of respective upper and lower sizing elements, each pair of elements being shaped to define therebetween a longitudinal portion of said passageway and the pairs of elements being disposed end to end and maintained in co-operating relationship in which the elements together define the whole of said passageway. Upper and lower backing members are disposed respectively above and below the pairs of sizing elements and extend over the entire length of said passageway. Means is provided releasably securing the backing members together to clamp the sizing elements therebetween. Each sizing element is and individual component and at least some of the sizing elements are provided with one or both of a vacuum port which communicates with vacuum openings into said passageway, and a cooling fluid port communicating with a cooling fluid chamber in the element. The port or ports open into a face of the element which is accessible from the exterior of the device.

It will be appreciated that a significant advantage of this device as compared with the prior art is that the sizing passageway in the device is defined by a plurality of individual sizing elements which can be manufactured individually to provide exactly the required configuration of cooling ports and vacuum ports. For ease of manufacture, the lower sizing elements (i.e. the elements adjacent the lower backing member) are preferably all identical to one another, and the upper sizing elements are also identical to one another. This greatly facilitates manufacture of the elements themselves since only two shapes of element will be required. Normally, it will not be possible to have all of the elements (both upper and lower) identical to one another unless the extrusion to be sized (and hence the passageway) is symmetrical about a horizontal plane. All of the sizing elements which are identical can conveniently be manufactured by a computer controlled machine tool, which greatly reduces the manufacturing cost of the sizing device.

In order that the invention may be more clearly understood, reference will now be made to the accompanying drawings which illustrate a preferred embodiment to the invention by way of example, and in which.

Figure 1:
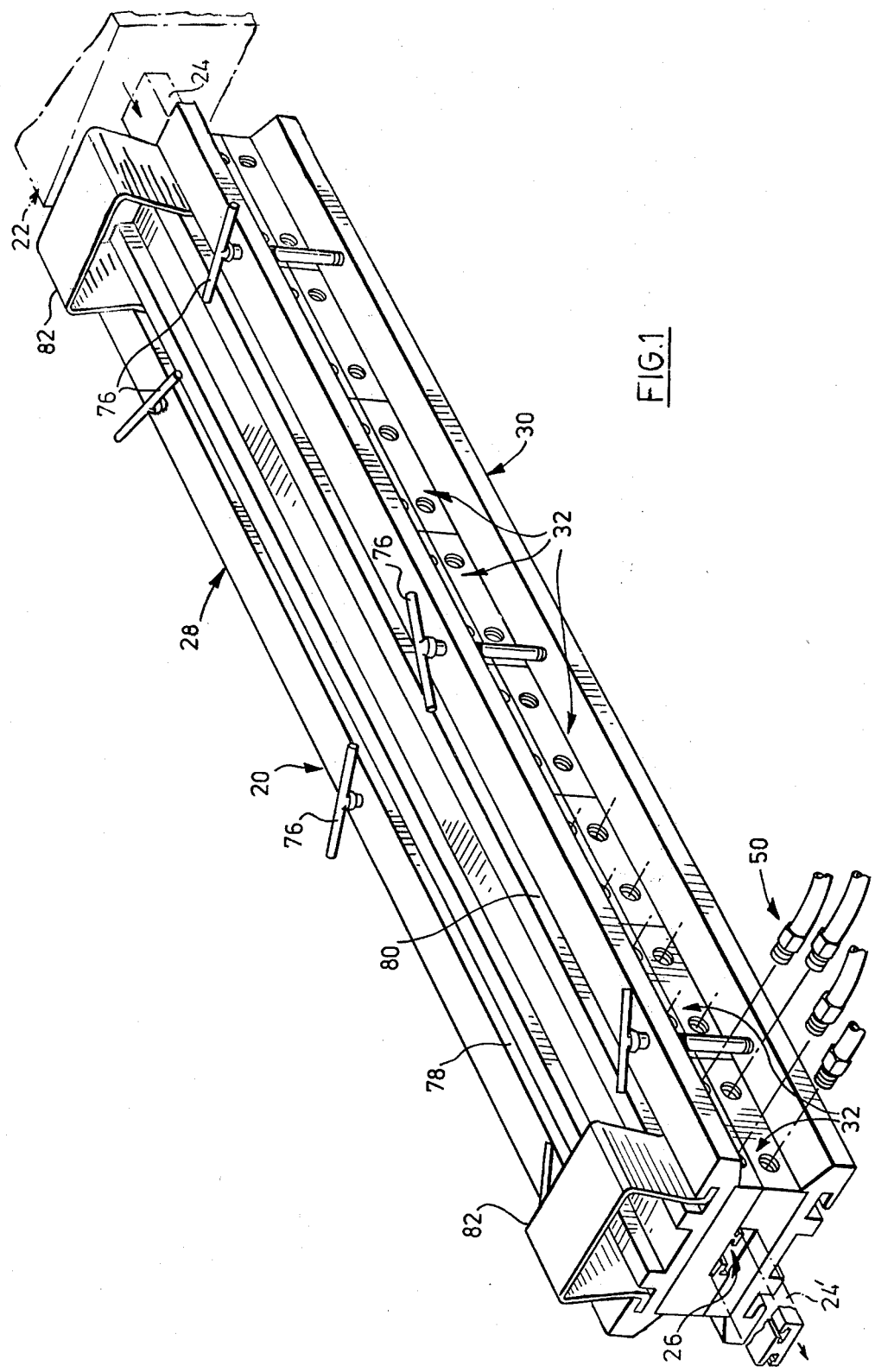
FIG. 1 is a perspective view of a vacuum sizing device in accordance with the invention.

Referring first to FIG. 1, the vacuum sizing device is generally denoted by reference numeral 20 and is shown positioned downstream from a plastic extruder represented in ghost outline at 22. A plastic extrusion continuously issuing from the extrusion die (not shown) of the extruder is indicated at 24. Device 20 has a passageway which extends longitudinally through the device and which has a cross-sectional size and shape corresponding to the required profile, size and shape of the extrusion 24. One end of this passageway is visible at the lower left-hand side of FIG. 1 and the passageway itself is denoted by reference numeral 26. Extrusion 24 enters passageway 26 at the right-hand end of the sizing device as seen in FIG. 1 and travels through the passageway at a speed dependent on the speed of operation of the extruder 22. Typically, a draw-off device and severing device (not shown) will be provided downstream of the vacuum sizing device 20. The extrusion leaving passageway 26 is represented in ghost outline at 24' and the cross-sectional shape of the extrusion is shown in full lines.

The sizing device is made up of a series of pairs of individual sizing elements clamped between upper and lower backing members. In FIG. 1, the backing members are denoted respectively 28 and 30 and the pairs of sizing elements between the members are generally indicated at 32. In the particular embodiment illustrated, there are eight pairs of sizing elements and the end faces of the elements in one pair are visible at the left-hand end of FIG. 1. The lower elements in each pair (i.e. the elements adjacent backing member 30) are all identical to one another and the upper elements (adjacent member 28) are identical to one another but are different from the lower elements.

Figure 2:
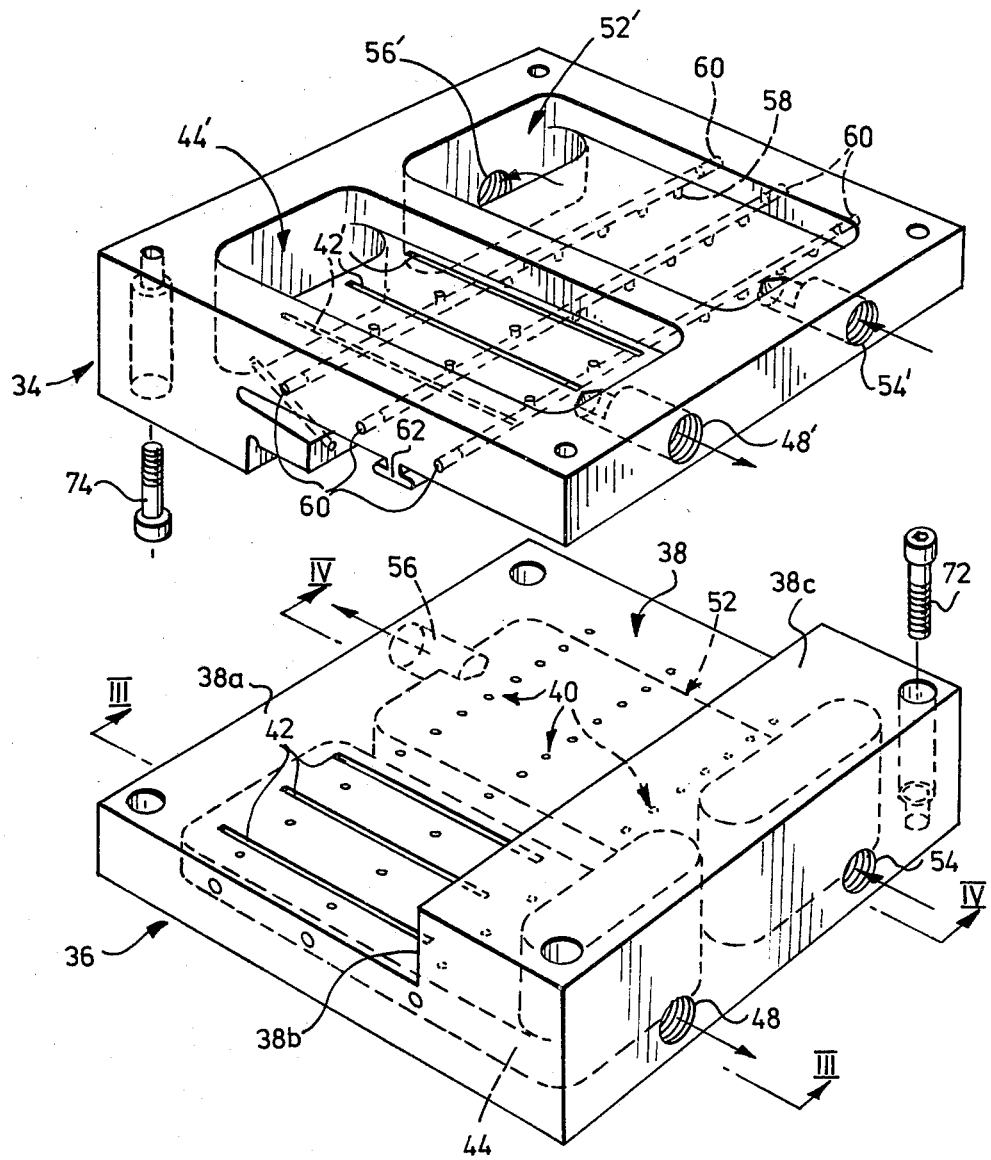
FIG. 2 is an exploded perspective view of a pair of sizing elements from the device shown in FIG. 1.
Figure 3:
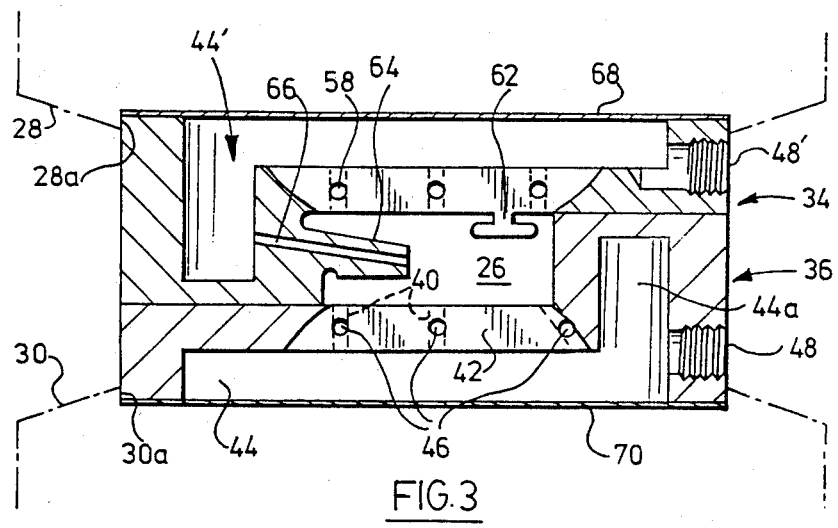
FIGS. 3 and 4 are vertical, sectional views on lines III—III and IV—IV of FIG. 2 respectively.
Figure 4:
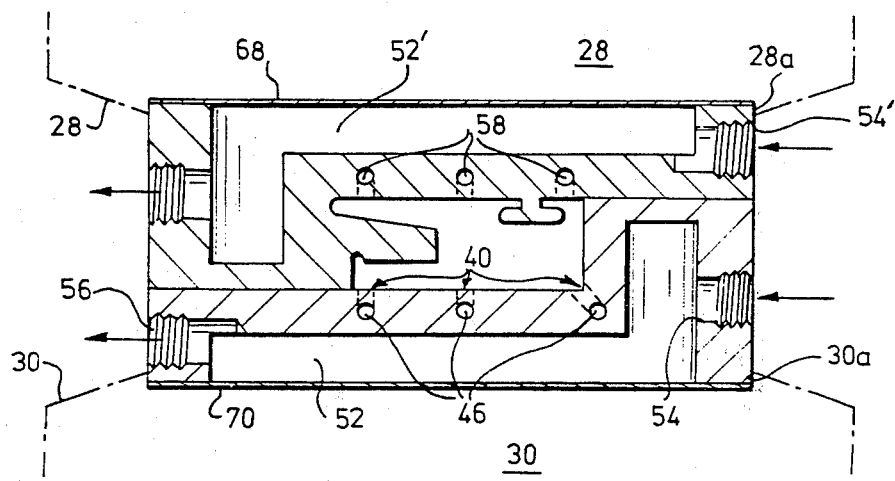

FIG. 2 shows one such pair of sizing elements, with the elements shown in exploded positions. FIGS. 3 and 4 are sectional views through the same two elements but shown in the positions they occupy in the assembled device. In these views, the elements are collectively denoted 32 (the same general reference numeral as used in FIG. 1), while the upper and lower elements themselves are individually denoted 34 and 36.

It can best be seen from FIGS. 3 and 4 that the two elements 34 and 36 are shaped to define therebetween a longitudinal portion of the passageway 26 through the sizing device. In the assembled device, the pairs of elements are disposed end to end and are maintained in co-operating relationship in which the elements together define the whole of passageway 26. With continued reference to FIGS. 3 and 4, it will be seen that each of the elements 34 and 36 is generally somewhat L-shaped in overall cross-section and that the elements are "nested" together, so as to define a space forming part of passageway 26. The surfaces of the respective elements which define this space are specially shaped according to the required profile in the plastic extrusion and are of uniform cross-sectional shape throughout the length of the element.

Referring back to FIG. 2, it will be seen that each element 34, 36 is generally of square shape in plan and may have sides of, say, four inches in length. Element 36 has a top surface 38 which includes a lower horizontal surface 38a, a vertical surface 38b and a top horizontal surface 38c. Surface 38b and part of surface 38a define parts of passageway 26 and the extrusion travels over these surfaces through passageway 26. In order to maintain the extrusion in close contact with these surfaces (and with the corresponding surfaces of element 34), vacuum openings are provided in the surfaces for connection to an external vacuum source. In the particular embodiment illustrated, it will be seen that surface 38a of element 36 is provided with three rows of small circular openings which are denoted by the reference numeral 40. The rows extend generally parallel to the length of passageway 26 and are spaced transversely of surface 38 with the extreme right-hand row as seen in FIG. 2 located at the junction between that surface and the vertical surface 38b. In addition, three vacuum openings in the form of slits denoted 42 are provided adjacent the left-hand (downstream) end of element 36 (as considered in the direction of movement of the extrusion along passageway 26). These slits are disposed generally parallel to one another and at right angles to the rows of openings 40.

The slits 42 extend downwardly into the body of element 36 and open into a vacuum chamber 44 which opens into the underside of element 36. Chamber 44 is visible in section in FIG. 3 and it will be seen that the chamber includes an upwardly extending portion 44a below the upper horizontal surface portion 38c of surface 38. This portion of the vacuum chamber is not in fact used in the illustrated embodiment but is provided so that additional vacuum openings can easily be provided by drilling through surface 38b and into the vacuum chamber if such openings are found to be necessary. The vacuum openings 40 communicate with vacuum chamber 44 by way of longitudinal passageways 46 (FIG. 3) which are drilled through the body of the element above chamber 44 and plugged at their ends. These passageways communicate with the slits 42 and the openings 40 extend vertically downwards into these passageways. In addition, the openings 40 which are directly above chamber 44 extend down into the chamber itself.

A screw threaded port 48 is provided in one side of element 36 which is accessible from the exterior of the assembled sizing device and communicates with chamber 44. This port can be fitted with a screw threaded coupling such as those generally indicated at 50 in FIG. 1 which can then be coupled to a vacuum source by way of a suitable hose.

Referring back to FIG. 2, it will be seen that vacuum chamber 44 occupies somewhat less than half of the overall length of the sizing element 36 and that a second, approximately similar chamber is provided alongside chamber 44. This second chamber, which is denoted 52 in FIG. 2 is a cooling fluid chamber through which water or some other cooling fluid can be circulated when the sizing device is in use. Chamber 52 is essentially of similar shape to chamber 44 but is provided with two ports, denoted 54 and 56, which open into respectively opposite sides of element 36. These ports are also screw threaded to receive couplings as the couplings 50 of FIG. 1 and in this case, one coupling will be connected to a supply of cold water and the other to a return line, typically to a spray cooler for dissipating heat removed from the sizing device. Of course, in the case of the cooling chamber, couplings will be provided both at the front side of the sizing device (at couplings 50) and at the rear side in FIG. 1.

FIG. 4 shows cooling fluid chamber 52 and the two ports 54 and 46; the arrows in FIG. 4 are intended to indicate the circulation of cooling fluid through the chamber.

Referring back to FIG. 2, sizing element 34 has vacuum and cooling chambers denoted 44' and 52' respectively which are essentially the same as the cooling chambers 44 and 52 of element 36. The chambers in element 34 are visible as seen from the underside. Slit-form vacuum openings communicating with vacuum chamber 44' are indicated at 42' and rows of vacuum openings similar to openings 40 are denoted 40'. The longitudinal passageways which provide communication between chamber 44' and the openings 40' are specifically shown in dotted outline in element 34 and are denoted by reference numeral 58. Plugs closing the ends of these passageways are indicated at 60. As in the case of element 36, vacuum chamber 44 is provided with a vacuum port, denoted 48' and cooling chamber 52' is provided with inlet and outlet ports denoted respectively 54' and 56'.

As indicated previously, all of the lower sizing elements in the element pairs 32 in the sizing device (FIG. 1) are identical with one another and all of the upper elements are similarly identical with one another. Further, the respective upper and lower elements are identical except insofar as differences are dictated by the shape of the extrusion to be sized. Thus, the upper sizing elements (as element 34) have specially shaped inner surfaces for defining a generally T-shaped formation 62 corresponding to a longitudinal channel in the extrusion, and an inward projection 64 at one side, again corresponding to a channel in the extrusion. In this latter case, a series of parallel vacuum openings 66 extend from the outer surface of this projection into the vacuum chamber 44' to assist in ensuring proper formation of this part of the extrusion. In any event, apart from these differences, all of the sizing elements are essentially the same and are manufactured on a computer controlled machine tool from standard metal blanks. Machine tools of this type can be set up to automatically produce exact duplicates of any required part, which means that, after the machine has been initially set up, the parts can be produced extremely inexpensively. The small changes required to machine the projection 62 and 64 in the case of elements 34, instead of the plan surfaces of element 36 can be readily programmed into the machine. As such, it is believed that a vacuum sizing device of the form provided by the invention can be manufactured for approximately one-tenth of the cost of a conventional device.

It should also be noted that the particular configuration of vacuum openings and cooling chambers shown in FIGS. 2 to 4 represents one example only and that many variations are possible. For example, while it is preferred from the viewpoint of minimizing costs to make all of the sizing elements essentially the same, in some cases, it may be desirable to use different elements at different places along the sizing device for different extrusions. For example, in some cases, it may be desirable to provide a large area of vacuum openings adjacent the upstream end of the sizing device, possibly with no cooling, and to provide cooling but no vacuum adjacent the opposite end of the device. This can easily be achieved by providing differently designed sizing elements at different locations. Alternatively, in some cases, it may be sufficient simply to blank off or leave unused some of the ports in selected ones of the sizing elements as may be required. In other cases, it may be desired to, say, provide extra vacuum ports in a particular area of a sizing element or to provide extra cooling. Again, this can readily be done by appropriate simple design changes. For example, instead of providing each sizing element with two chambers as in the illustrated embodiment, four chambers could be provided and could be designed as, say, two vacuum chambers and two cooling chambers or three cooling chambers and one vacuum chamber or whatever configuration was considered appropriate for the particular profile of the extrusion to be sized.

It will be appreciated from the foregoing comments that the vacuum sizing device in accordance with the invention allows for a wide range of cooling and vacuum conditions to be achieved with any one particular sizing device and at the same time allows those conditions to be easily changed by simply changing a particular sizing element, pair of sizing element or group of such elements. Preferably, the sizing elements will all be modular in the sense that any pair of elements will be of the same overall size as any other pair of elements to permit interchangeability.

Referring back to FIGS. 3 and 4, the backing members 28 and 30 are indicated in ghost outline only in those views but it will be seen that the sizing elements fit into shallow channels denoted 28a and 30a in the respective backing members. Thus, each sizing element in effect sits within the channel of the associated backing member and a rubber gasket is provided between the base of the channel and the outer face of the sizing element. In FIGS. 3 and 4, the respective gaskets are indicated at 68 and 70. The gaskets provide a seal against leakage of air into the vacuum chambers or leakage of cooling water from the cooling chambers. Each sizing element is bolted to the associated backing member by four socket head screws such as the screws indicated at 72 and 74 in FIG. 2. It will be seen from that view that each element is provided with four holes, one adjacent each corner of the element; each hole receives one socket at its screw which is screwed into a complimentary screwthreaded recess in the relevant backing member. Thus, the upper sizing elements (as element 34) are all bolted to the upper backing member 28 while the lower sizing elements are bolted to member 30.

Referring back to FIG. 1, the two backing members are releasably secured together by T-head bolts 76 which pass through plain openings overhanging side portions of the upper backing member 28 and are screwed into screwthreaded openings in corresponding portions of backing member 30. The bolts have shoulders (not visible) which bear against the top surface of member 28 so that when all of the bolts are tightened, they effectively clamp the two backing members together with the sizing elements in between. However, if the bolts are removed, the upper backing member 28 can be lifted away from the lower backing member and will carry with it the upper sizing elements (as element 34) leaving the lower elements bolted to the lower backing member. In this way, the pairs of sizing elements are all simultaneously separated, providing access to the surfaces of the elements which define the passageway 26. In the illustrated embodiment, this would allow access to an extrusion jammed within the passageway 26 (e.g. as a result of a power failure) because the extrusion would come away with the upper sizing elements due to the presence of the projections 62 and 64 (FIG. 3) which would be engaged in the extrusion. However, it should be borne in mind that this might well be impossible with some extrusions which could be engaged with both the upper and lower sizing elements.

FIG. 1 shows the cross-sectional shape of the backing members 28 and 30. Both members are of constant cross-sectional shape throughout their lengths and both have angle section slots running along their outer surfaces, as the slots 78 and 80 in the case of backing member 28. These slots can be used to receive carrying handles 82 having outer end portions shaped to fit within the slots. These handles permit the whole sizing device to be carried when the bolts 76 are in place or, when the bolts have been removed, allow the upper vacuum member 28 and the upper sizing elements to be lifted off the lower elements as a unit.

It will of course be appreciated that the preceding description relates to a particular embodiment of the invention by way of example, and that many modifications are possible within the broad scope of the invention. A number of possible modifications have been specifically indicated above and it should again be emphasized that the particular configuration of cooling chambers and vacuum chambers disclosed is given by way of example only and may vary.

The sizing elements within any one sizing device are preferably, but not necessarily modular in the sense of being all of the same overall size and shape. The sizing elements are preferably made of aluminum (for lightness) with nickel coated wearing surfaces, but again this is not essential. Examples of other metals which could be used are brass and stainless steel although stainless steel would need to be hardened or chrome plated at least at the wearing surfaces.

In the illustrated embodiment, the sizing elements are shown as being bolted to the respective backing members 28 and 30, but again this is not essential, although some form of location means (e.g. studs) is desirable between the sizing elements and the backing members. The backing members may also be aluminum but preferably are made of steel.

I claim:

1. A vacuum sizing device having a passageway which extends longitudinally therethrough and which has a cross-sectional size and shape corresponding to the required profile size and shape of a plastic extrusion to be sized in the device, wherein the device comprises:
   a plurality of pairs of respective upper and lower sizing elements, each pair of elements being shaped to define therebetween a longitudinal portion of said passageway and the pairs of elements being disposed end to end and maintained in co-operating relationship in which the elements together define the whole of said passageway;
   upper and lower backing members disposed respectively above and below said pairs of sizing elements and extending over the entire length of said passageway, and
   means releasably securing said backing members together to maintain the pairs of sizing elements in said co-operating relationship;
   each said sizing element being an individual component and at least some of said elements being provided with one or both of a vacuum port which communicates with vacuum openings into said passageway, and a cooling fluid port communicating with a cooling fluid chamber in said element, said port or ports opening into a face of the element which is accessible from externally of the device.

2. A device as claimed in claim 1, wherein said pairs of sizing elements are modular in that each pair is of the same overall shape and size.

3. A device as claimed in 1, wherein each said upper element is releasably secured to the associated backing member and each said lower sizing element is releasably secured to the associated lower backing member, while the sizing elements in each pair are free of direct attachment to one another.

4. A device as claimed in claim 3, wherein some at least of said sizing elements include a vacuum chamber communicating with said vacuum openings, and wherein said chamber opens into a rear face of the element and is closed by the associated backing member with the interposition of a gasket.

5. A device as claimed in claim 4, wherein said vacuum chamber communicates with the vacuum openings by way of at least one passageway extending longitudinally through the sizing element and the ends of which are plugged.

6. A device as claimed in claim 3, wherein each said cooling fluid chamber provided in sizing element opens into a rear face of the element and is closed by the associated backing member with the interposition of a gasket.

7. A device as claimed in claim 3, wherein each sizing element is provided with a cooling fluid chamber and a vacuum chamber, said chambers being disposed side by side and being of substantially similar shape, the vacuum chamber communicating with said vacuum openings, and said chambers each opening into a rear face of the element and being closed by the associated backing member with the interposition of a gasket.

8. A device as claimed in claim 1, wherein said backing members are shaped to overhang the sizing elements at both sides of the device, and wherein said releasable securing means comprise bolts extending through overhanging portions of said backing members at both sides of the device and releasably securing the members together.

9. A device as claimed in claim 1, wherein each said backing member has an outer face which includes two parallel angle-section channels extending longitudinally of the face and adapted to receive complimentarily shaped end portions of handles for facilitating lifting of the device and backing member.

10. A device as claimed in claim 1, wherein each said sizing element is made of aluminum and is coated with nickel on wearing surfaces thereof.

* * * * *